(12) United States Patent
Maini et al.

(10) Patent No.: US 9,478,832 B2
(45) Date of Patent: Oct. 25, 2016

(54) POWER PACK SYSTEM AND A VENTILATION SYSTEM PROVIDED THEREIN

(71) Applicant: Mahindra Reva Electric Vehicles Pvt. Ltd., Bangalore (IN)

(72) Inventors: Chetan Kumar Maini, Bangalore (IN); Gajanan Kale, Bangalore (IN); Kannan Katturaja, Tuticorin (IN); Jayakumar Janardhanan, Trichy (IN)

(73) Assignee: MAHINDRA REVA ELECTRIC VEHICLES PVT. LTD., Bangalore (IN)

( * ) Notice: Subject to any disclaimer, the term of this patent is extended or adjusted under 35 U.S.C. 154(b) by 0 days.

(21) Appl. No.: 14/347,645

(22) PCT Filed: Sep. 25, 2012

(86) PCT No.: PCT/IN2012/000637
§ 371 (c)(1),
(2) Date: Mar. 27, 2014

(87) PCT Pub. No.: WO2013/046230
PCT Pub. Date: Apr. 4, 2013

(65) Prior Publication Data
US 2014/0234675 A1 Aug. 21, 2014

(30) Foreign Application Priority Data
Oct. 1, 2011 (IN) .......................... 3408/CHE/2011

(51) Int. Cl.
*H01M 10/635* (2014.01)
*H01M 10/6563* (2014.01)
*H01M 10/6571* (2014.01)

(52) U.S. Cl.
CPC ....... *H01M 10/5024* (2013.01); *H01M 10/635* (2015.04); *H01M 10/6563* (2015.04); *H01M 10/6571* (2015.04)

(58) Field of Classification Search
CPC ......... H01M 10/5024; H01M 10/635; H01M 10/6571; H01M 10/6563; H01M 10/6565; H01M 10/6566
See application file for complete search history.

(56) References Cited

U.S. PATENT DOCUMENTS 5,687,770 A * 11/1997 Sharp .............................. 138/44
7,642,003 B2    1/2010 Ahn et al.
(Continued)

FOREIGN PATENT DOCUMENTS

CN    201528026 U    7/2010
CN    201608249 U    10/2010
(Continued)

*Primary Examiner* — Muhammad Siddiquee
(74) *Attorney, Agent, or Firm* — VKM Law Group

(57) ABSTRACT

A power pack system includes an energy storage system having a plurality of energy storage devices and a thermal management system. The thermal management system includes a battery ventilation system connected to energy storage system for achieving and maintaining a predetermined temperature within energy storage system by providing a two way circulation of a working fluid. Further, the system includes a housing having a top cover and a bottom cover to receive and secure the energy storage devices therein. The top cover and bottom cover configured to retain said energy storage devices in a sealable manner. Further, a method for achieving and maintaining a pre determined temperature within an energy storage system includes providing two way circulation of a working fluid and maintaining a uniform flow velocity of the fluid at least inside the energy storage system.

11 Claims, 19 Drawing Sheets

(56) References Cited

U.S. PATENT DOCUMENTS

| | | |
|---|---|---|
| 2002/0034682 A1* | 3/2002 | Moores et al. .............. 429/120 |
| 2006/0216582 A1* | 9/2006 | Lee et al. ..................... 429/120 |
| 2007/0248876 A1 | 10/2007 | Ahn et al. |
| 2008/0213652 A1* | 9/2008 | Scheucher ..................... 429/62 |
| 2010/0136406 A1* | 6/2010 | Song et al. .................. 429/120 |
| 2010/0255360 A1* | 10/2010 | Umemoto .............. H01M 2/24 |
| | | 429/120 |
| 2010/0261046 A1* | 10/2010 | German et al. ............. 429/120 |
| 2010/0275619 A1 | 11/2010 | Koetting et al. |
| 2011/0269387 A1* | 11/2011 | Leffert et al. .................. 454/75 |
| 2012/0082875 A1* | 4/2012 | Watanabe ........... H01M 2/1077 |
| | | 429/71 |
| 2012/0315517 A1* | 12/2012 | Duff et al. ..................... 429/61 |

FOREIGN PATENT DOCUMENTS

| | | |
|---|---|---|
| JP | 2010-272319 A | 12/2010 |
| WO | WO2007/052910 A1 | 5/2007 |
| WO | WO2010/126239 A2 | 11/2010 |

* cited by examiner

US 9,478,832 B2

POWER PACK SYSTEM AND A VENTILATION SYSTEM PROVIDED THEREIN

FIELD OF INVENTION

The disclosed embodiments relate generally to a power pack and more particularly, but not by way of limitation, to a power pack having a ventilation system for achieving and maintaining an optimum temperature range within the power pack.

BACKGROUND

In the recent days, use of electrical devices has dramatically increased across multiple fields like transportation, businesses, education and so on. Proper function of electrical devices calls for reliable source of power for the electrical devices. Generally, the electrical devices that use electrical energy as the source of power include an energy storage system. Power packs such as battery packs are commonly used as energy storage systems in many electrical systems. A battery pack includes a plurality of batteries which are used to store energy in a chemical form.

In devices such as electric vehicles, batteries are used to power the motor system of the vehicle. Batteries in such devices store electrical and/or mechanical energy in the form of chemical energy and thereafter, supply the stored chemical energy in the form of electrical energy to the motor system. The chemical reactions in batteries are dependent on temperature. The chemical reactions may be exothermic, where heat is generated, or may be endothermic, where heat is absorbed during the process of the chemical reaction. In exothermic reactions, the batteries are subjected to overheating because the chemical reaction reinforces the heat generated by the current flow.

Generally, for a battery to have a high performance and longer life, the battery should be operated within an optimum temperature range. If the battery is in operation for a substantially long duration, the heat generated within the battery will cause the temperature within the battery to rise beyond the optimum temperature threshold thereby decreasing the performance and life of the battery. More often than not, the temperature range for operating a battery as specified by the battery manufacturer is much narrower than the temperature range for operating the battery as desired by the manufacturer of a device, for example the manufacturer of a vehicle, in which the battery is indented to be used. Further, the temperature variation from module to module in a battery pack leads to a different charge or discharge behavior of each module resulting in a decreased efficiency of the battery pack.

Furthermore, if an electric vehicle, is to be operated in extreme cold condition, the battery used therein should be heated to initiate the charging process Therefore, the battery assembly should be constructed such that by heating the battery pack, the temperature of the battery pack should rise within a minimal time period and further, the temperature deviation within the battery pack should be minimum.

In view of the above, there is a need for a power pack system which is capable of heating the energy storage system when the device, in which the power pack is used, is operated in extreme cold condition. Further, there is a need for a power pack system which is capable of dissipating heat generated by the chemical reaction within a battery cell.

OBJECT

An object is to provide a power pack system for achieving and maintaining an optimum temperature range.

Another object is to provide a power pack system for dissipating heat generated in the cells included therein.

A further object is to provide a power pack system which is capable of heating and cooling the energy storage system to the predetermined temperature.

Another object is to provide a power pack system which is configured to facilitate two directional flow of the air for heating the energy storage system.

Yet another object is to provide a power pack system which is configured to facilitate a passage of air inside the energy storage system at a uniform velocity.

These and other objects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

Embodiments are illustrated in the accompanying drawings, throughout which like reference letters indicate corresponding parts in the various figures. The embodiments herein will be better understood from the following description with reference to the drawings, in which.

DETAILED DESCRIPTION

Figure 1A:
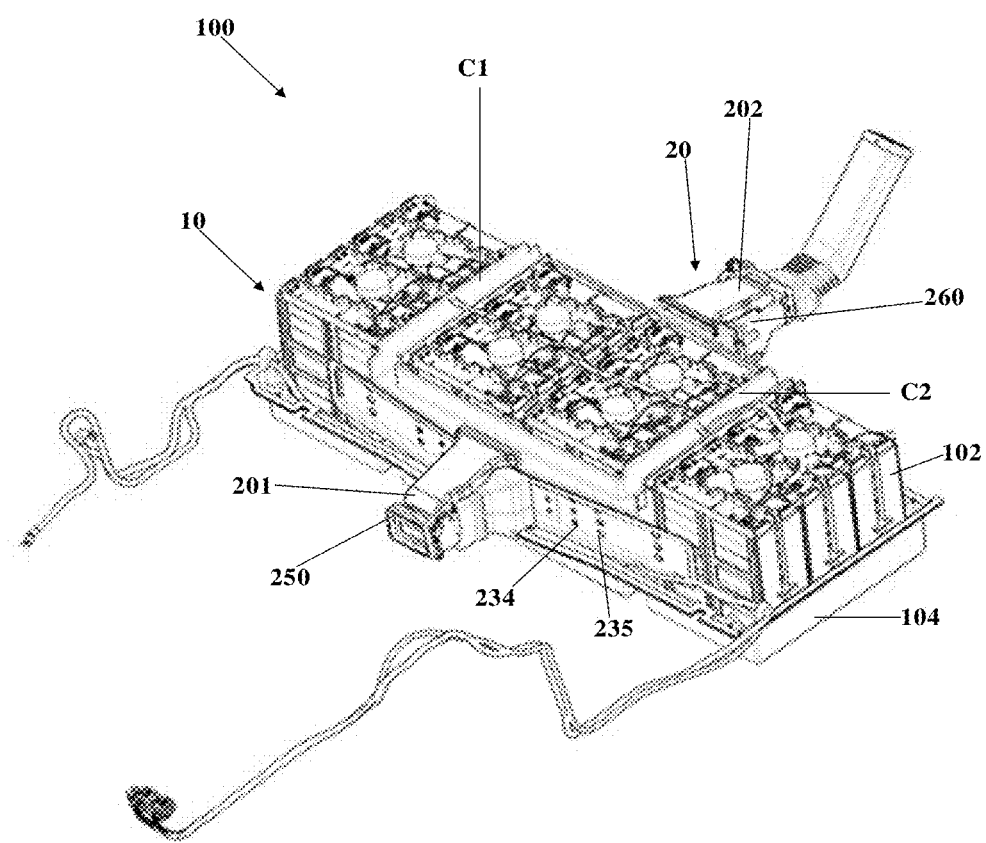
FIG. 1A depicts a power pack system having a ventilation system, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring now to the drawings, and more particularly to FIGS. 1A through 1E, where similar reference characters denote corresponding features consistently throughout the figures, there are shown embodiments.

Figure 1B:
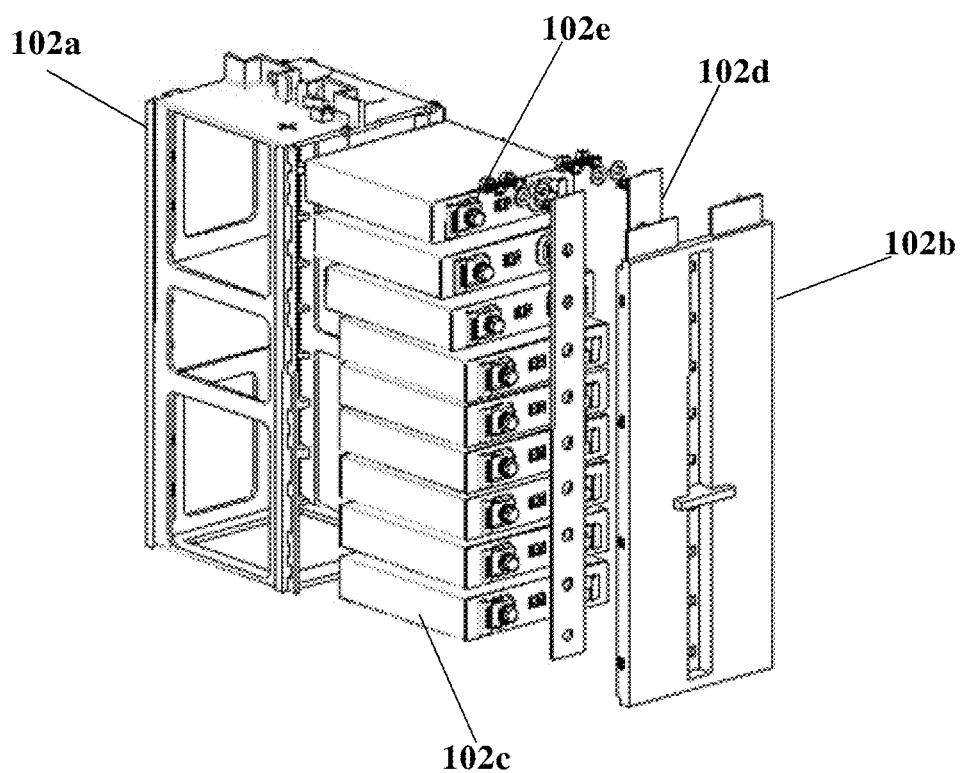
FIG. 1B is a perspective view of a battery module to be included in the power pack system, according to an embodiment as disclosed herein.

FIG. 1A depicts a power pack system 100 having an energy storage system such as a battery pack 10 and a thermal management system including a ventilation system 20. The battery pack 10 includes a plurality of energy storage devices such as battery modules 102. Further, the battery pack 10 includes a bottom cover 104, and a top cover 106. As shown in FIG. 1B, each of the battery modules 102 has a housing H. The housing H includes a first casing 102a configured to receive a plurality of cells 102c. It should be noted that for the purpose of this description, the energy storage system is considered as a battery pack 10 and the battery modules 102 are considered as a Lithium-Ion battery modules. Furthermore, for the purpose of this description, the number of battery modules 102 is considered as twenty four (24) and the number of cells 102c in each of the module 102 is considered as nine (9). The first casing 102a defines a plurality of openings O to allow passage of air. In one embodiment, each of the cells 102c is slid inside the first casing 102a. The cells 102c are arranged one above the other inside the first casing 102a. The cells 102c define a predetermined gap there between to allow passage of air through the openings O. It should be noted that, any alternative arrangement of the cells 102c within the housing H without otherwise deterring the intended function of the structure as set forth herein is also within the scope of this invention. The thermal management system further includes system architecture to control the ventilation system 20 and other components of the thermal management system.

Figure 1C:
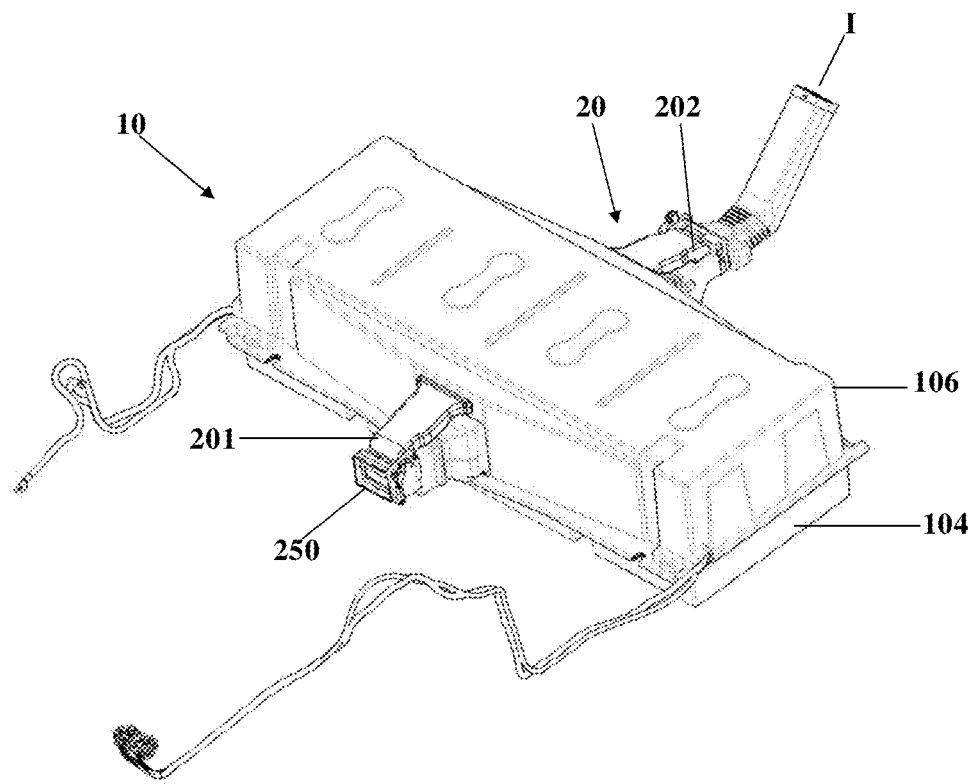
FIG. 1C depicts a perspective view of the power pack system with a top cover, according to an embodiment as disclosed herein.

The housing H further includes a second casing 102b configured to retain the cells 102c inside the first casing 102a. Further, an internal cell bus bar 102d is provided between the second casing 102b and cell terminal 102e of each of the cells 102c. Each of the battery modules 102 is adapted to be received inside the bottom cover 104. The battery modules 102 are arranged adjacent to each other on the bottom cover 104 so that the opening O provided in the first casing 102a of one battery module 102 is in alignment with the opening O provided in the first casing 102a of the adjacent battery module 102. Further, as shown in FIG. 1C, the top cover 106 is provided on the battery modules 102 received in the bottom cover 104 thereby enclosing the cells 102c and the battery modules 102. The top cover 106 and the bottom cover 104 may be sealed by a gasket (not shown) and a triple compound (not shown) to avoid any leakage.

Further, the ventilation system 20 includes a recirculation duct 200, a first fan 220, a second fan 222, a third fan 224, a fourth fan 226, a first heater 230, a second heater 232, a first baffle plate 234, a second baffle plate 236, a first actuator assembly 250 and a second actuator assembly 260. The first fan 220, the second fan 222, the third fan 224, the fourth fan 226, the first heater 230 and the second heater 232 are connected to the thermal management system (not shown). Further, each of the first fan 220, the second fan 222, the third fan 224, the fourth fan 226 are provided with a feedback system which communicates with the thermal management system to regulate heating or cooling of the power pack system 100. The recirculation duct 200 further includes a first end 201 and a second end 202 and at least a first channel C1 and a second channel C2 defined between the first end 201 and the second end 202 of the recirculation duct 200. Further, in one embodiment the recirculation duct 200 is provided external to the battery modules 102 and below the top cover 106. As shown in FIG. 1E, the first channel C1 and the second channel C2 are supported by guide plates G1 and G2, respectively. The guide plates G1 and G2 are secured to the bottom cover 104.

Figure 1D:
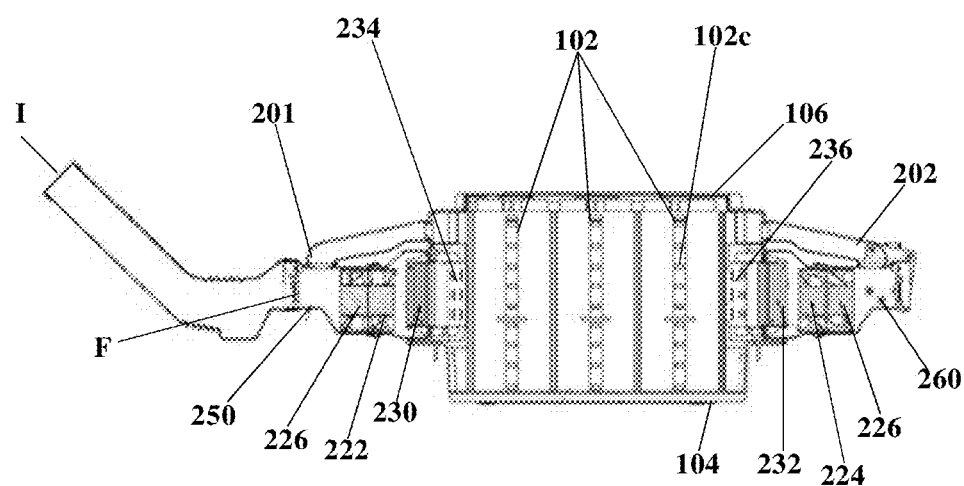
FIG. 1D is a sectional view of the power pack system, according to the embodiment as disclosed herein.
Figure 1E:
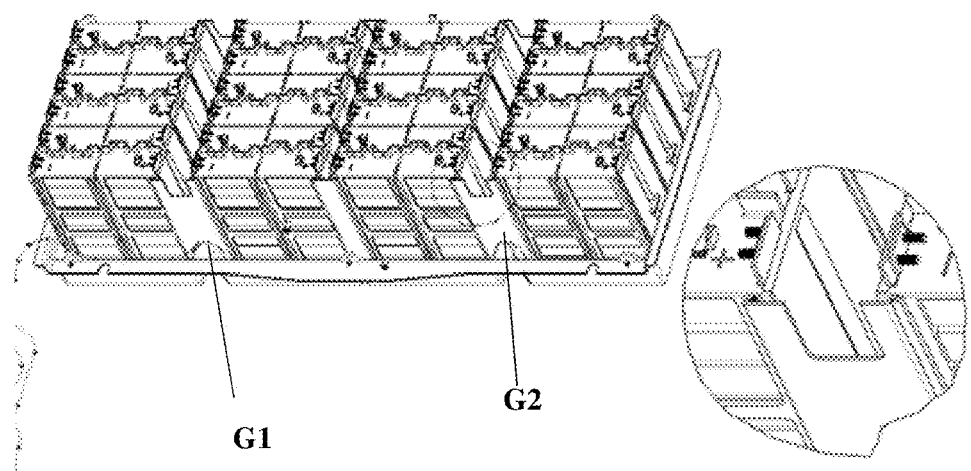
FIG. 1E is a perspective view of the power pack system with guide plates, according to an embodiment disclosed herein.
Figure 2:
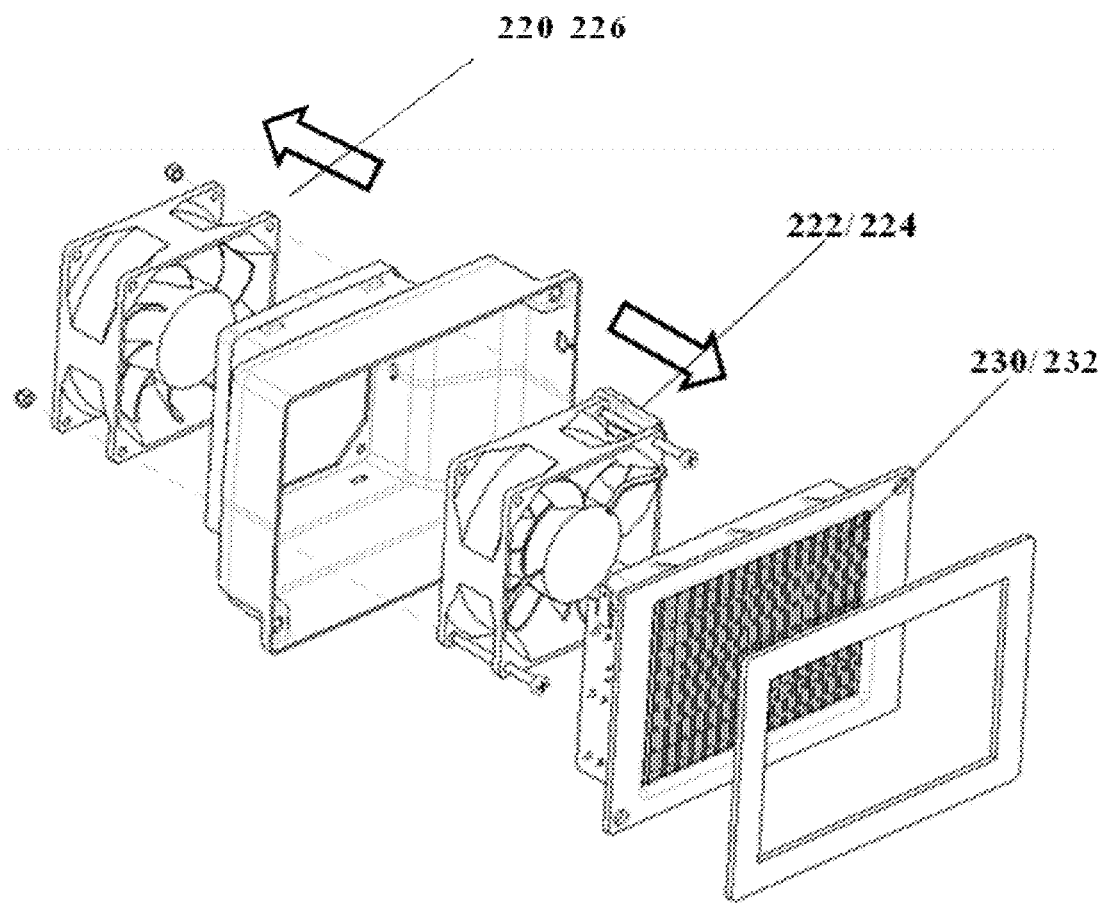
FIG. 2 is an exploded view of the fan and heater assembly.

As shown in FIG. 1D, the first fan 220, the second fan 222 and the first heater 230 are located near the first end 201 of the recirculation duct 200. Further, the third fan 224, the fourth fan 226 and the second heater 232 are located near the second end 202 of the recirculation duct 200. The first actuator assembly 250 is in contact with the first end 201 of the recirculation duct 200 and the second actuator assembly 260 is in contact with the second end 202 of the recirculation duct 200. FIG. 2 shows an exploded view of a fan-heater assembly.

Further, the first baffle plate 234 is positioned near the battery modules 102 of the battery pack 10. The first heater 230 is configured to be placed adjacent to the first baffle plate 234 and away from the battery modules 102. The second fan 222 is positioned adjacent to the first heater 230 and away from the first baffle plate 234. Further, the first fan 220 is positioned adjacent to the second fan 222 and away from the first baffle plate 234. The first actuator assembly 250 which is in direct contact with the first end 201 of the recirculation duct is also configured to be in direct fluid communication with the first fan 220.

Similarly, the second baffle plate 236 is positioned near the battery modules 102 of the battery pack 10. The second heater 232 is configured to be placed adjacent to the second baffle plate 236 and away from the battery modules 102. The third fan 224 is positioned adjacent to the second heater 232 and away from the second baffle plate 236. Further, the fourth fan 226 is positioned adjacent to the third fan 224 and away from the second baffle plate 236. The second actuator assembly 260 which is in direct contact with the second end 201 of the recirculation duct is also configured to be in direct fluid communication with the fourth fan 226.

Figure 3A:
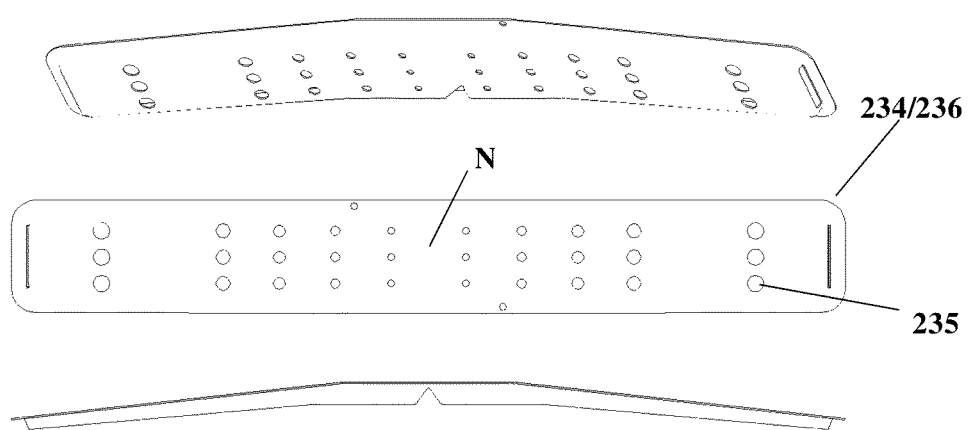
FIG. 3A illustrates baffle plate, according to a embodiment disclosed herein.

Further, as shown in FIG. 3A, each of the first and second baffle plates, 234 and 236, defines a plurality of orifices 235 with varying diameter. The baffle plates 234 and 236, along with the orifices 235 essentially facilitate lesser pressure drop and substantially uniform air flow velocity for each battery modules 102. The first and second baffle plates, 234 and 236, are generally rectangular in shape and define the orifices across the width thereof. Further, each of the baffle plates 234 and 236 has a notch N at a center thereof. The orifices 235 of varying diameter are located on either side of the notch N.

Figure 3B:
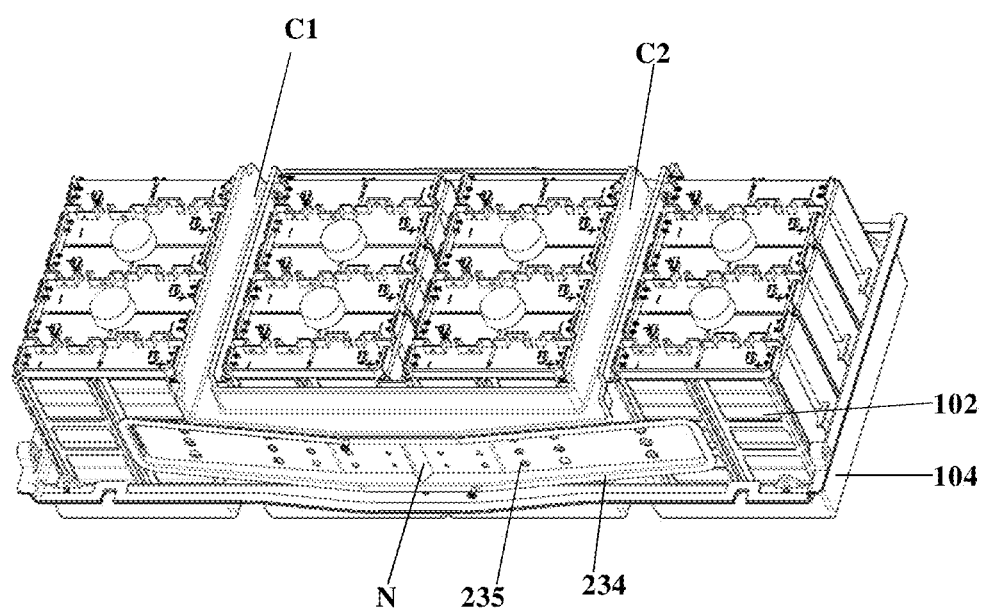
FIGS. 3B and 3C shows the baffle plate secured to a bottom cover of the power pack system, according to an embodiment disclosed herein.
Figure 3C:
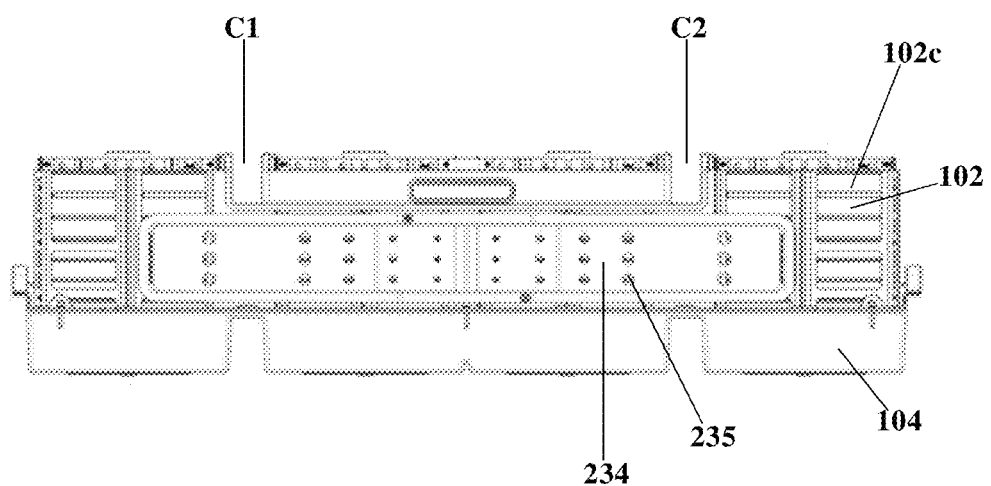
Figure 3D:
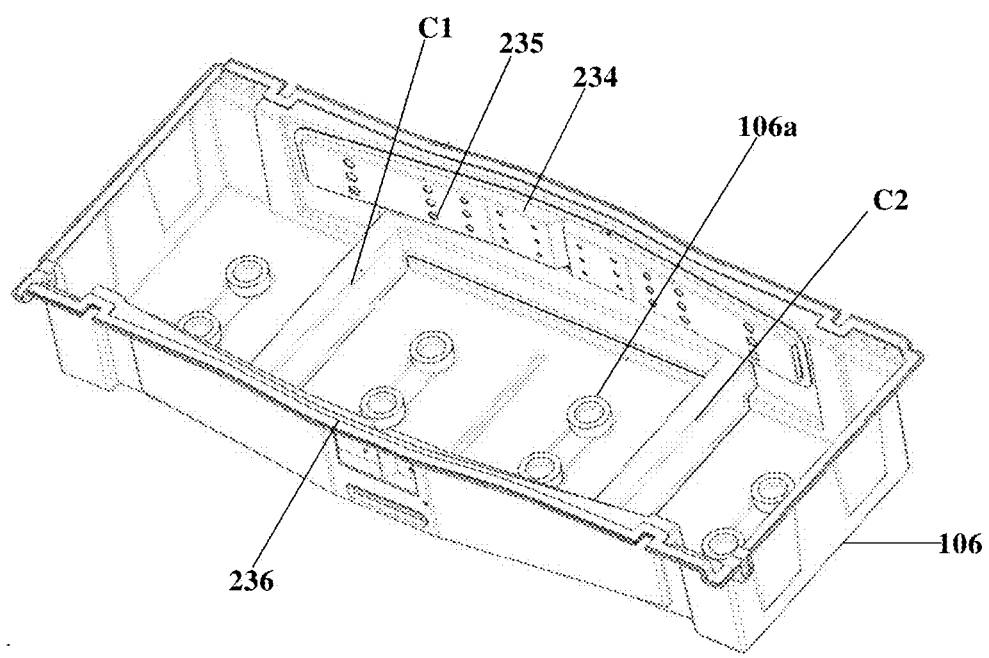
FIG. 3D shows the baffle plate secured to an inner portion of the top cover of the power pack system, according to an embodiment disclosed herein.

As shown in FIGS. 3B and 3C, in one embodiment, each of the baffle plates 234 and 236 may be directly provided on the battery modules 102 in which case, the baffle plates 234 and 236, may be secured to the bottom cover 104 by known attachment means. Further, as shown in FIG. 3D, in another embodiment, each of the baffle plates 234 and 236 may be provided on an inner side surface 106s of the top cover 106 of the battery pack 10. The top cover 106 further includes a plurality of battery holder 106a to secure the battery modules 102.

Figure 4A:
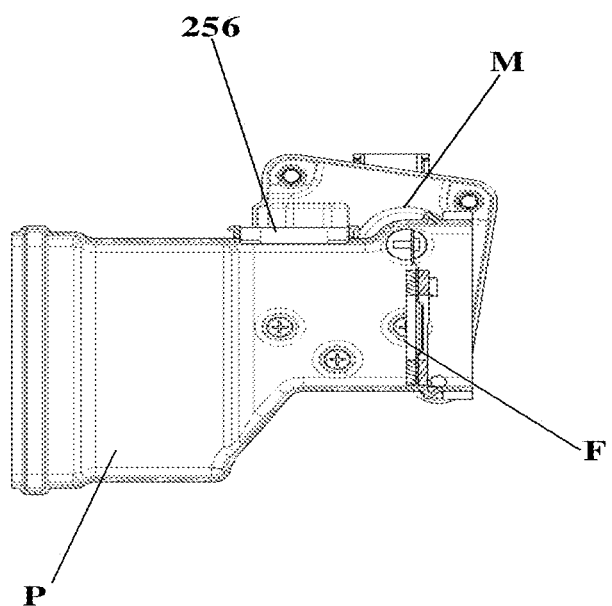
FIGS. 4A-4B show the actuator assembly according to the embodiments as disclosed herein.
Figure 4B:
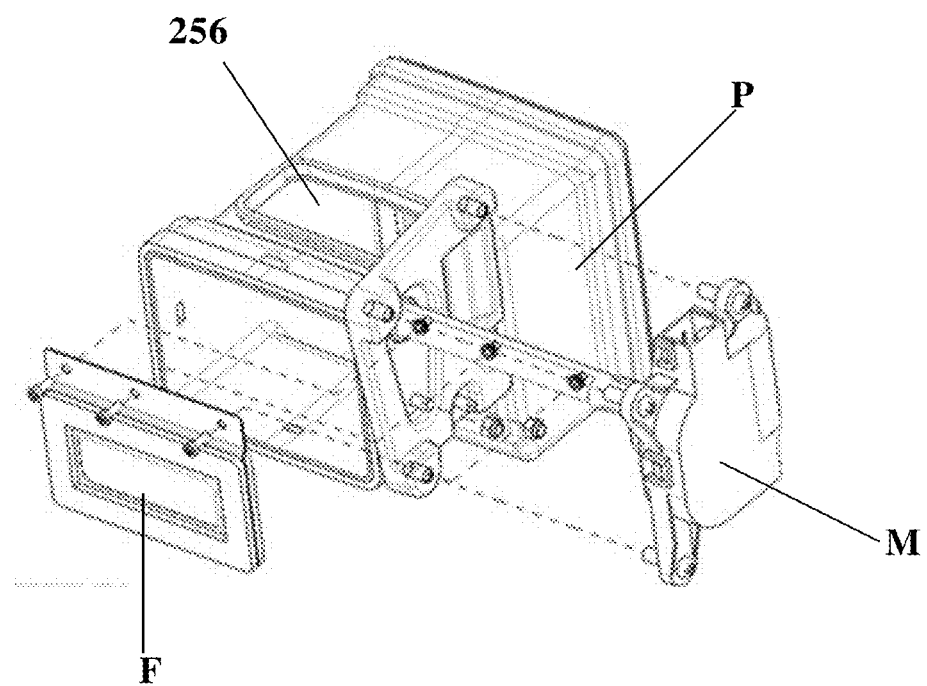

Further, as shown in FIGS. 4A and 4B, each of the actuator assemblies 250 and 260 has a plenum chamber P, an opening 256, a flap F and an actuator mechanism M. The opening 256 is in fluid communication with the corresponding first and second end 201 and 202 of the recirculation duct 200. Further, the flap F of each of the actuator assemblies 250 and 260 is adapted to be moveable between a closed position, where the flap F closes the opening 256 of each of the actuator assemblies 250 and 260. The Flap F is connected to the actuator mechanism M which in turn is connected to a thermal management system (not shown).

Further, explained below is the operation of the power pack system 100 having an energy storage system such as a battery pack 10 and a ventilation system 20 and a method of heating and cooling the battery module 102 of the battery pack 10 thereby the battery pack 10 using the ventilation system 20.

Figure 5A:
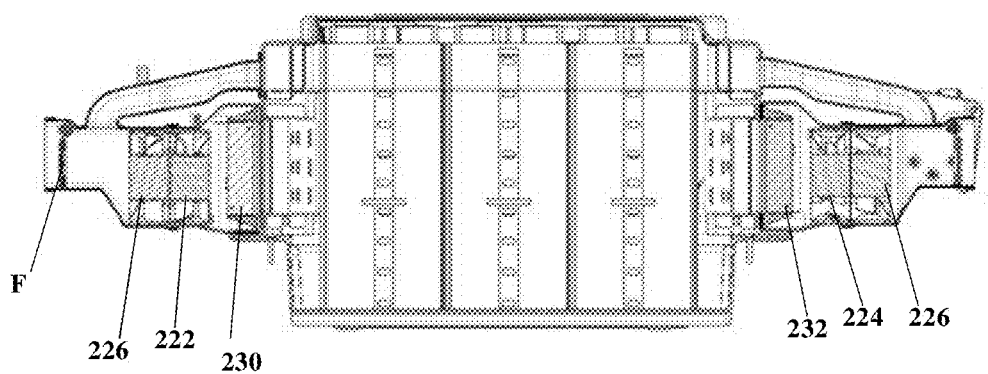
FIGS. 5A-5C show the power pack operating in a heating mode.
Figure 5B:
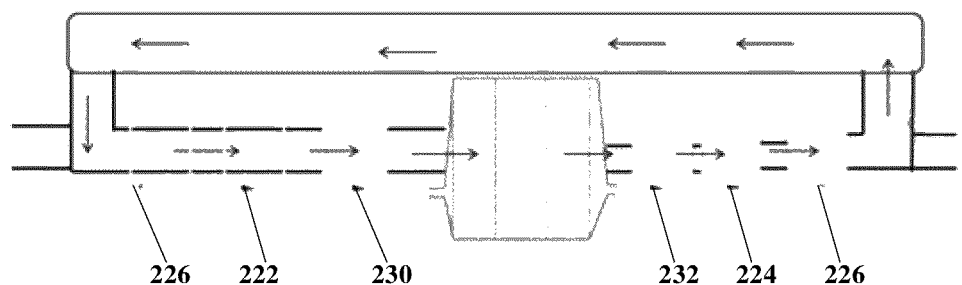
Figure 5C:
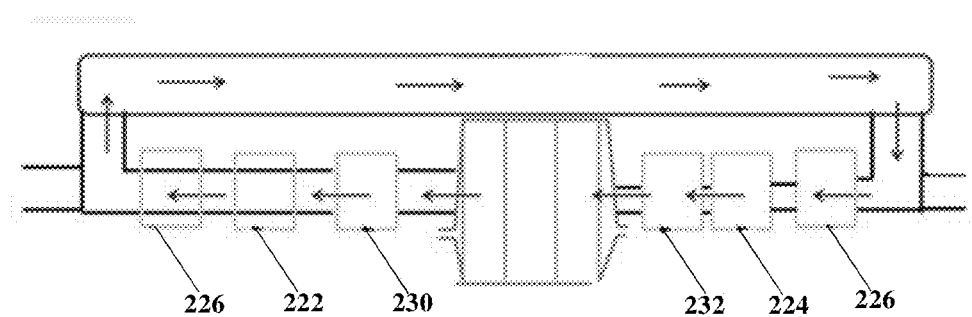

If the power pack system 100 is supposed to be operated in an extreme cold condition, the battery pack 10 has to be initially heated for the charging process to begin. Temperature sensors (not shown) of the thermal management system (not shown) senses the external temperature and the temperature of the battery back 10. If the temperature is below a predetermined degree, the thermal management system activates heating mode for the battery pack 10. FIGS. 5A-5C illustrate the heating mode of the battery pack 10. In the heating mode, the first and second heaters 230 and 232 are in the ON state and the flap F of each of the actuator assemblies 250 and 256 is in the open position. The heating mode includes a first cycle in which air flows in a counter-clockwise direction and a second cycle in which air flows in a clockwise direction. In the first cycle, the second fan 222 and the fourth fan 226 are in the ON state. Specifically, the second fan 222 will be in a push mode where the air is pushed through the battery modules 102 and the fourth fan 226 will be in a suction mode where the air pushed by the second fan 222 is sucked by the fourth fan 226. During the process, air pushed from the second fan 222 will pass through the first heater 230 and then, via the orifices 251 of the first baffle plate 234, hot air is passed through the battery modules 102. Thereafter, the hot air is sucked by the fourth fan 226 via the second baffle plate 236 through the second heater 232 thereby again heating the air. The hot air from the fourth fan 226 is allowed to pass through the second end 202 of the recirculation duct 200. Thereafter, the air is passed through each of the first and the second channel C1 and C2 towards the first end 201 of the recirculation duct 200 and then through the first actuator assembly 250. The second fan 222 receives the air from the first actuator assembly 250 and the process as mentioned above repeats and for a predetermined duration.

Similarly, in the second cycle, the first fan 220 and the third fan 224 are in the ON state. Specifically, the third fan 224 will be in a push mode where the air is pushed through the battery modules 102 and the first fan 220 will be in a suction mode where the air pushed by the third fan 224 is sucked by the first fan 220. During the process, air pushed from the third fan 224 will pass through the second heater 232 and then, via the orifices 251 of the second baffle plate 236, hot air is passed through the battery modules 102. Thereafter, the hot air is sucked by the first fan 220 via the first baffle plate 234 through the first heater 230 thereby again heating the air. The hot air from the first fan 220 is allowed to pass through the first end 201 of the recirculation duct 200. Thereafter, the air is passed through each of the first and the second channel C1 and C2 towards the second end 202 of the recirculation duct 200 and then through the second actuator assembly 260. The third fan 224 receives the air from the second actuator assembly 260 and the process as mentioned above repeats and for a predetermined duration. The two directional flow of the hot air via the recirculation duct 200 during the heating mode ensures that the battery pack 10 and the battery modules 102 attains a predetermined temperature required for initial charging of the battery pack 10.

Figure 6A:
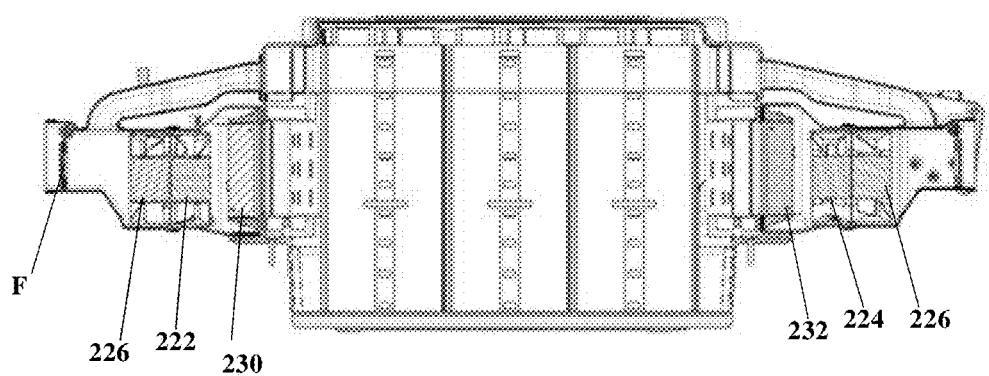
FIGS. 6A-6C show the power pack operating in a cooling mode.
Figure 6B:
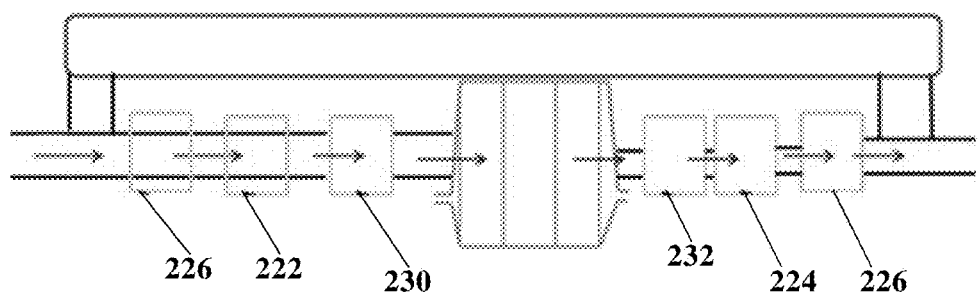
Figure 6C:
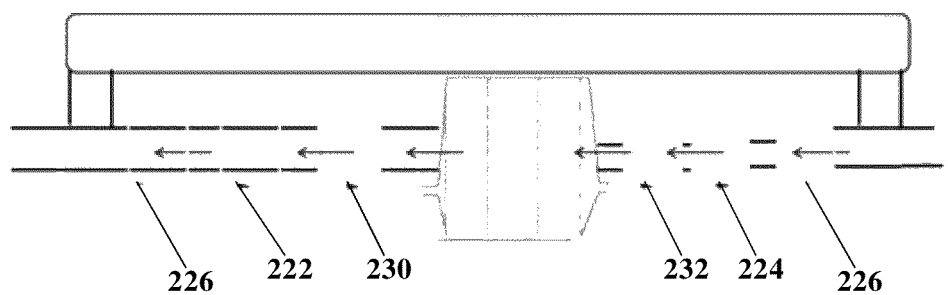

Further, FIGS. 6A-6C illustrates the cooling mode of the battery pack 10. In the cooling mode, the first and second heaters 230 and 232 are in the OFF state and the flap F of each of the actuator assemblies 250 and 256 is in the closed position. The cooling mode includes a first cycle in which air flows towards the second actuator assembly 260 and a second cycle in which air flows towards the first actuator assembly 250. In the first cycle, the second fan 222 and the fourth fan 226 are in the ON state. Specifically, the second fan 222 will be in a push mode where the air is pushed through the battery modules 102 and the fourth fan 226 will be in a suction mode where the air pushed by the second fan 222 is sucked by the fourth fan 226. During the process, air pushed from the second fan 222 will pass through the orifices 251 of the first baffle plate 234 and then the air is passed through the battery modules 102. Thereafter, the air is sucked by the fourth fan 226 via the second baffle plate 236. The air from the fourth fan 226 is allowed to pass through the second actuator assembly 260 and to the external environment without otherwise passing through the second end 202 of the recirculation duct 200. Further, since the heater is in the OFF state, the air will essentially have ambient temperature which in effect causes the battery modules 102 and hence the battery pack 10 to dissipate the heat accumulated.

Similarly, in the second cycle, the first fan 220 and the third fan 224 are in the ON state. Specifically, the third fan 224 will be in a push mode where the air is pushed through the battery modules 102 and the first fan 220 will be in a suction mode where the air pushed by the third fan 224 is sucked by the first fan 220. During the process, air pushed from the third fan 224 will pass through the orifices 251 of the second baffle plate 236 and then the air is passed through the battery modules 102. Thereafter, the air is sucked by the first fan 220 via the first baffle plate 234. The air from the fourth fan 226 is allowed to pass through the first actuator assembly 250 and to the external environment without otherwise passing through the first end 201 of the recirculation duct 200. Further, since the heater is in the OFF state, the air will essentially have ambient temperature which in effect causes the battery modules 102 and hence the battery pack 10 to dissipate the heat accumulated.

Several tests were conducted for heating and cooling of the battery pack in different ambient conditions ranging from −15° C. to 45° C. till the battery module reaches the maximum temperature of 20° C. The tests conducted illustrate that the battery modules may be heated uniformly.

Figure 7:
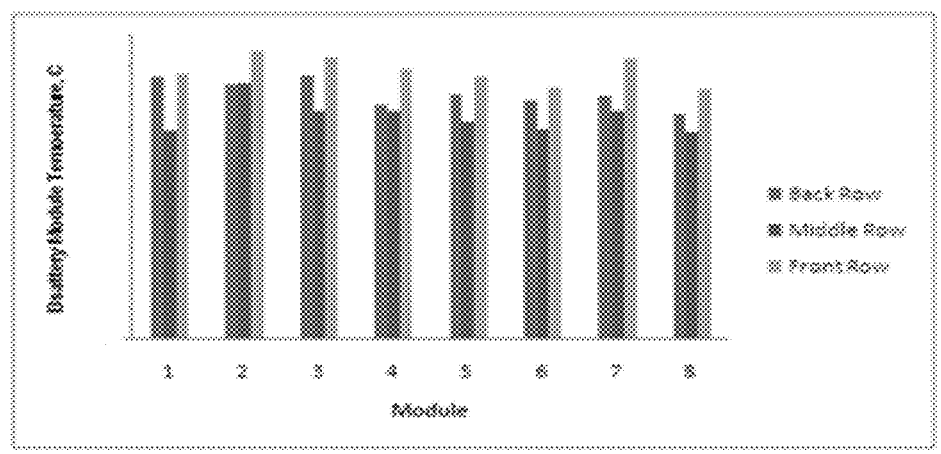
FIG. 7 is a graph showing the battery module temperature.

FIG. 7 illustrates the observation on the test that has been conducted on 24 Li-ion battery modules. The battery modules are provided in three rows namely back row, front row and the middle row, where each row comprises of 8 battery modules. Further, it can be noticed from the FIG. 7 that the battery module temperature between the three rows are substantially same and the temperature deviation is observed as 2.9° C. which is less than the desirable limit of 3° C.

The embodiment disclosed herein specifies a power pack system 100 having a thermal management system with ventilation system 20 for achieving and maintaining an optimum temperature inside the power pack system 100. The thermal management system controls at least the fan assembly and the heater assembly provided in the ventilation system 20 through system architecture. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A power pack system for heating and cooling a battery module of battery pack, said system comprising:
   an energy storage system, said energy storage system comprising a plurality of energy storage devices, wherein said energy storage system is a battery pack and each of said energy storage devices is a battery cell and a plurality of said battery cells are stacked together as a battery module;
   a thermal management system wherein said thermal management system includes a ventilation system connected to said energy storage system for achieving and maintaining a predetermined temperature within said energy storage system, said ventilation system comprising:
   a recirculation duct, wherein said recirculation duct is configured to facilitate a two directional flow of air to perform at least one of the heating and cooling of at least one of the plurality of energy storage devices;
   a first set of fans adapted to be provided with a feedback system configured to communicate with the thermal management system to regulate heating and cooling of the power pack system near a first end of said recirculation duct;
   a second set of fans adapted to be provided near a second end of said recirculation duct;
   a first heater adapted to be provided near said first end of said recirculation duct,
   a second heater adapted to be provided near said second end of said recirculation duct, wherein at least one of said first and second heater is configured to be in fluid communication with said second set of fans; and
   a system architecture to control said ventilation system, wherein said system architecture is configured to control at least one of a fan assembly and a heater assembly of said thermal management system to perform at least one of the heating and cooling of at least one of the plurality of energy storage devices; and
   a housing connected to said battery module, wherein said housing comprises of a top cover and a bottom cover to receive and secure said energy storage devices, wherein said top cover further includes plurality of battery holders to secure battery modules and said bottom cover configured to retain said energy storage devices in a sealable manner.

2. The power pack system as in claim 1, wherein said ventilation system comprises of:
   a first baffle plate adapted to be provided on a first side of said energy storage system;
   a second baffle plate adapted to be provided on a second side, opposite to the first side of said energy storage system;
   a first actuator assembly connectable to said first end of said recirculation duct; and a second actuator assembly connectable to said second end of said recirculation duct.

3. The power pack system as claimed in claim 2, wherein said first set of fans include a first fan provided adjacent to second fan; said second fan provided adjacent to said first heater, said first heater located adjacent to said first baffle plate, wherein said baffle plates are configured to be fixed to a notch at the centre with orifices of varying diameter; and said first fan provided adjacent to said first actuator.

4. The power pack system as claimed in claim 3, wherein said second set of fans include a third fan provided adjacent to fourth fan; said third fan provided adjacent to said second heater; said second heater located adjacent to said second baffle plate; and said fourth fan provided adjacent to said second actuator assembly which is configured to be in direct contact with the second end of said recirculation duct.

5. The power pack system as claimed in claim 4, wherein each of said first and second actuator assembly includes a plenum chamber defining an opening, a flap moveably connected to said chamber, said flap adapted to move between a first position, where said first flap is located away from opening and a second position, where said flap closes the opening and an actuator mechanism which in turn is connected to thermal management system.

6. The power pack system as claimed in claim 5, wherein in said heating mode, said flap of each of said actuator assembly is in a first position.

7. The power pack system as claimed in claim 6, wherein in a first cycle of said heating mode, the air flows in a counterclockwise direction; each of said first and second heaters generates heat and said second and fourth fans are in an ON state, where one of said second and fourth fan is in a push mode and the other of said second and fourth fans is in a suction mode.

8. The power pack system as claimed in claim 6, wherein in a second cycle of said heating mode, the air flows in a clockwise direction; each of said first and second heater generates heat and said first and third fans are in an ON state, where one of said first and third fans is in the push mode and the other of said first and third fans is in the suction mode.

9. The power pack system as claimed in claim 5, wherein in a cooling mode, said flap of each of said actuator assembly is in a second position.

10. The power pack system as claimed in claim 9, wherein in a first cycle of said cooling mode, each of said first and second heaters are in a OFF state and said second and fourth fans are in an ON state, where said second fan is in a push mode and the fourth fan is in a suction mode.

11. The power pack system as claimed in claim 10, wherein in a second cycle of said cooling mode, each of said first and second heaters are in a OFF state and said first and third fans are in an ON state, where said third fan is in the push mode and the first fan is in the suction mode.

* * * * *